United States Patent [19]

Buzzi, Jr.

[11] 4,426,813

[45] Jan. 24, 1984

[54] APPARATUS FOR MOUNTING ELEMENTS ON A SLATE, CEDAR SHAKE OR SHINGLED ROOF

[76] Inventor: John L. Buzzi, Jr., 169 Maple Ave., Metuchen, N.J. 08840

[21] Appl. No.: 402,141

[22] Filed: Jul. 26, 1982

[51] Int. Cl.³ .............................................. E04F 19/00
[52] U.S. Cl. .................................... 52/27; 52/173 R; 248/295.1
[58] Field of Search ............... 52/27, 173 R, 478, 486, 52/713, 764; 126/450; 248/295.1, 656, 669

[56] References Cited

U.S. PATENT DOCUMENTS

| | | | |
|---|---|---|---|
| 1,764,071 | 6/1930 | Foulke | 52/27 X |
| 3,000,146 | 9/1961 | Rogers | 52/27 X |
| 4,204,523 | 5/1980 | Rothe | 126/450 |
| 4,226,058 | 10/1980 | Riley | 52/27 |
| 4,261,338 | 4/1981 | McAlister | 126/450 |

FOREIGN PATENT DOCUMENTS

| | | | |
|---|---|---|---|
| 572767 | 2/1958 | Italy | 52/27 |
| 1431833 | 4/1976 | United Kingdom | 52/713 |

*Primary Examiner*—J. Karl Bell

*Attorney, Agent, or Firm*—Paul H. Kochanski; John G. Gilfillan, III

[57] ABSTRACT

There is disclosed an apparatus for mounting elements on a roof, the elements having a mounting bracket, and the roof being formed by a plurality of beam supports wherein are mounted a plurality of spaced transverse roof supports having a fixably attached roof convering thereon, the roof covering having a plurality of bores therethrough, said apparatus comprising a sleeve member positioned on said roof covering and formed by a plate member having an opening therethrough and a tubular collar member affixed to the plate member in axial alignment with the opening in the plate member thereby forming a duct. The duct is positioned in axial alignment with the bore in the roof covering. The mounting apparatus also comprises a mounting member positioned on the beam supports having an attachment member in axial alignment with the bore in the roof covering and the duct formed in the sleeve member and a rod member engaged to the attachment member on the mounting member and extending upwardly through the bore in the roof covering and the duct formed in the sleeve member which rod member is fixably engagable with the mounting bracket of the element to be mounted on the roof.

11 Claims, 2 Drawing Figures

APPARATUS FOR MOUNTING ELEMENTS ON A SLATE, CEDAR SHAKE OR SHINGLED ROOF

FIELD OF THE INVENTION

This invention relates to an apparatus for mounting elements on a roof, and more particularly an apparatus for mounting elements on a slate, cedar shake or shingled roof.

BACKGROUND OF THE INVENTION

There is disclosed in U.S. Pat. No. 4,269,173 to Keueger et al. a system for mounting solar collector panels comprising modular sections having leg members mounted to the top of the roof by angle mounted brackets and supporting mounting spars for holding solar panels. Therefore, the weight of the solar collecting system is essentially on the roofing surface.

A second type of mounting system for solar collectors on a roof is disclosed in U.S. Pat. No. 4,204,523 to Rothe wherein a flat rectangular shell surrounded by an outer frame is mounted on the roof sheeting. The shell is supported directly on the roof after the roof tiles have been removed. This mounting assembly is in close proximity to the roof.

Finally, U.S. Pat. No. 4,165,853 to Brandt discloses a swivel mount for solar collectors which maintain a predetermined orientation with respect to the position of the sun. As with the other embodiments previously described the mount itself is affixed to the roofing surface.

In each of the described embodiments, a major problem arises; that is, the weight of the solar collector or any other element so mounted is directly upon the roof or on the roof covering itself. Additionally, the methods of mounting previously described cause the mounted solar collectors or other elements to be disposed in an ineffective surface-to-surface relationship with the roofing material thereby causing the occurrence of wood rot, slate failure and the like from water seepage. Additionally, by mounting solar collectors or other elements directly on a roofing material there will be compression of the roofing material with the roof surface leading to physical damage of the roofing material.

OBJECTS OF THE INVENTION

An object of the present invention is to provide a novel apparatus for mounting elements such as solar collectors on a roof.

Another object of the present invention is to provide a novel apparatus for mounting elements on a slate, cedar shake or shingled roof.

Still another object of the present invention is to provide a novel apparatus for mounting elements on a roof wherein the weight of the elements is transferred from the roof onto the underlying roof beams.

A further object of the present invention is to provide a novel apparatus for mounting elements on a roof which maintains the water tight integrity of the roofing surface.

SUMMARY OF THE INVENTION

These and other objects of the present invention are achieved by an apparatus for mounting elements on a roof, the elements having a mounting bracket, and the roof being formed by a plurality of beam supports wherein are mounted a plurality of spaced transverse roof supports having a fixably attached roof covering thereon, the roof covering having a plurality of bores therethrough, said apparatus comprising a sleeve member positioned on said roof covering and formed by a plate member having an opening therethrough and a tubular collar member affixed to the plate member in axial alignment with the opening in the plate member thereby forming a duct. The duct is positioned in axial alignment with the bore in the roof covering. The mounting apparatus also comprises a mounting member positioned on the beam supports, having an attachment member in axial alignment with the bore in the roof covering and the duct formed in the sleeve member and a rod member engaged to the attachment member on the mounting member and extending upwardly through the bore in the roof covering and the duct formed in the sleeve member which rod member is fixably engagable with the mounting bracket of the element to be mounted on the roof.

BRIEF DESCRIPTION OF THE DRAWINGS

Other objects and advantages of the present invention will become apparent by reference to the following detailed description of the embodiment thereof when taken in conjunction with the accompanying drawings, in which.

DETAILED DESCRIPTION OF THE INVENTION

Figure 1:
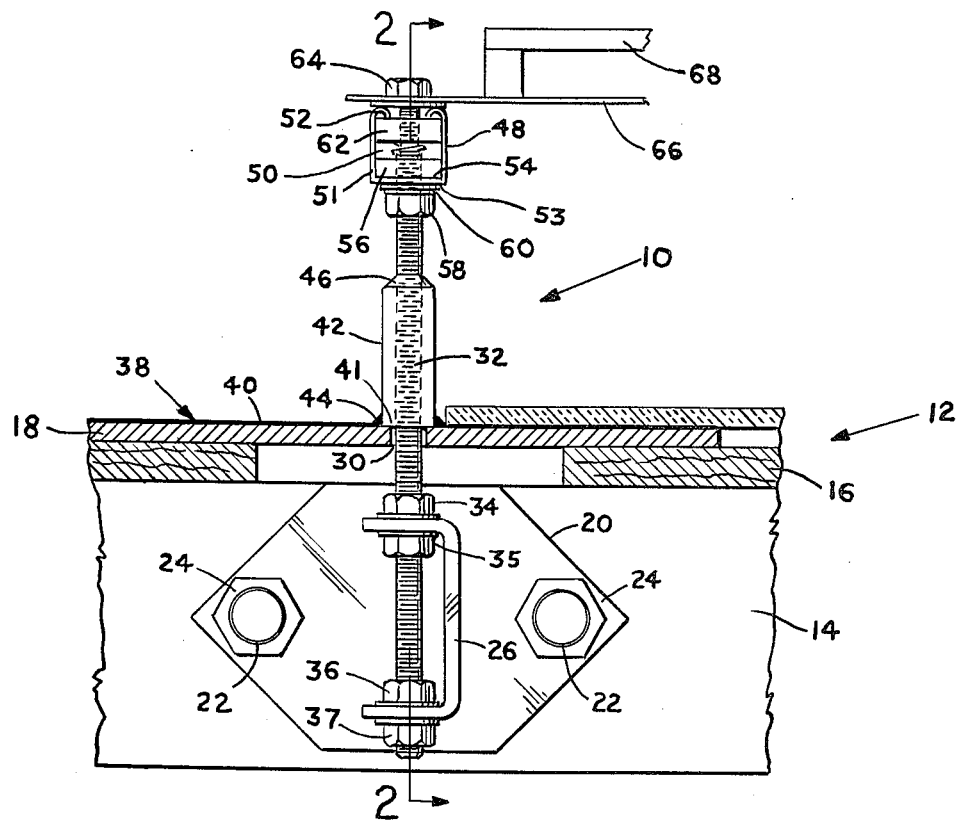
FIG. 1 is a side elevational view of the present invention positioned on a mounting support.
Figure 2:
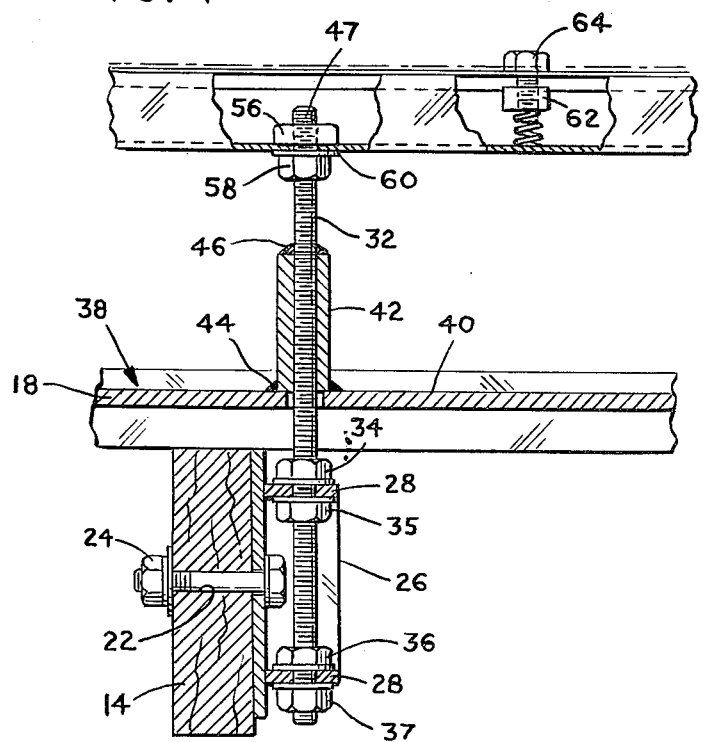
FIG. 2 is a front elevational view of the present invention positioned on a mounting support.

Referring now to FIGS. 1 and 2, there is shown an apparatus for mounting elements such as solar collectors or the like on a roof, generally indicated as 10. The apparatus 10 is utilized with respect to a standard roof, generally indicated as 12, having a plurality of structural beam supports 14 over which are mounted a plurality of spaced transverse intermediate roof supports 16, to which are mounted in a conventional manner a roof cover such as cedar shakes, generally indicated as 18. The invention is also adaptable to be used with other roofing materials such as slate, asbestos shingle, plastic fiber shingle, or the like.

The apparatus 10 for mounting elements on a roof contemplates that a plate 20 with mounting orifices 22 is rigidly secured to beam support 14 through the use of standard bolts with nuts, generally indicated as 24. The shape of plate 20 can be hexagonal (as shown), rectangular or the like. A U-shaped bracket 26 is secured to plate 20 such as by welding. The U-shaped bracket 26 is provided with a pair of axially aligned orifices, generally indicated as 28. The pair of orifices 28 are aligned vertically with respect to the beam support 14. The pair of orifices 28 can be threaded.

Axially positioned to axially aligned orifices 28 is orifice 30 through roof covering 18 and intermediate roof support 16. Extending through orifice 30 and axially disposed in the axially aligned orifices 28 is threaded rod 32. The threaded rod 32 can be a bolt or an ½ inch stainless steel rod. Threaded rod 32 is maintained in axial orientation with respect to the U-shaped bracket 26 through the cooperation of a four nut securing arrangement, 34, 35, 36 and 37 respectively. Nuts 35 and 36 may be secured to U-shaped bracket 26 by welding or the like.

Prior to mounting threaded rod 32 through orifice 30 in roof covering 18, there is positioned on the roof covering a waterproofing element 38 comprising a copper base plate 40 having an orifice 41 and a copper tube 42. Copper tube 42 can be ¾" L copper or similar material. The copper tube 42 is brazed to copper plate 40 at connection point 44 such that copper tube 42 is in axial alignment with orifice 41 in copper plate 40.

Waterproofing element 38 is positioned on roof covering 18 such that copper tube 42, the orifice 41 in copper plate 40 and orifice 30 in roof covering 18 are provided to be axial with orifices 28 of U-shaped bracket 26; therefore when threaded rod 32 is positioned in U-shaped bracket 26, threaded rod 32 extends through orifice 30 in roof covering 18, orifice 41 in copper plate 40 and copper tube 42.

To increase the waterproofing characteristics of the present invention, copper plate 40 is of such a size as to be extendable beyond the upper most end of the lower cedar shake 18 as best may be seen in FIG. 1. Additionally, water-tight integrity is maintained between threaded rod 32 and copper tube 42 by inserting an appropriate sealant material 46 between the rod 32 and the inside diameter of the copper tube 42. The sealant material 46 can be 1200 G.E. silicone sealant or the like.

Threadably secured to an end 47 of threaded rod 32 is a mounting assembly 48. The mounting assembly 48 includes a U-shaped channel 50 having side walls 51, shoulder member 52 formed by bending the sidewalls 51 of U-shaped channel 50 inwardly to define a restraining means, an exterior bottom wall 53, and an interior bottom wall 54. Disposed within U-shaped channel 50 is a nut 56 secured therein by welding or the like. The nut 56 is used to threadably secure rod 32 to the U-shaped channel 50. The rod 32 is further secured to U-shaped channel 50 through the use of a locking nut 58 and washers 60 at the exterior bottom wall 53 of U-shaped channel 50.

Also disposed within U-shaped channel 50 is a spring loaded nut 62 such as to be urged from an interior bottom wall 54 of U-shaped channel 50 upwardly against shoulder members 52. The spring loaded nut 62 is adapted to receive a bolt 64 for securing a mounting flange 66 for a device 68 to be mounted above the roof 12. Such devices 68 that may be mounted on a roof in this manner are solar panels, photovoltaic cells, stand-offs for piping systems, stand-offs for conduit piping and roof mounted billboards or signs.

Numerous modifications and variations of the above disclosed invention are possible in light of the above teachings and therefore, within the scope of the appended claims the invention may be practiced otherwise than as particularly claimed.

What is claimed:

1. An apparatus for mounting elements on a roof, said elements having a mounting assembly and said roof being formed by a plurality of beam supports wherein are mounted a plurality of spaced transverse roof supports having a fixably attached roof covering thereon, said roof covering having a plurality of bores therethrough, comprising:
   (a) a sleeve member positioned on said roof covering and formed by a plate member having an opening therein and a tubular collar member affixed to said plate member in axial alignment with said opening in said plate member thereby forming a duct, said duct positioned in axial alignment with said bore in said roof covering;
   (b) a mounting member positioned on said beam supports, said mounting member having an attachment member in axial alignment with said bore in said roof covering and said duct formed in said sleeve member; and
   (c) a rod member engaged to said attachment member on said mounting member and disposed upwardly through said bore in said roof covering and said duct formed in said sleeve member in coaxial alignment and fixably engagable with said mounting assembly of said element.

2. The apparatus for mounting elements on a roof as defined in claim 1 wherein said mounting member is a metal plate mounted on said beam support, said metal plate having a U-shaped bracket welded thereon, said U-shaped bracket provided with a pair of axially aligned threaded orifices positioned vertically with respect to said beam support and in axial alignment with respect to said bore in said roof covering and said duct formed on said sleeve member.

3. The apparatus for mounting elements on a roof as defined in claim 2 wherein said rod member is a threaded bolt, threadably engagable within said orifices of said U-shaped bracket.

4. The apparatus for mounting elements on a roof as defined in claim 1 wherein said sleeve member is positioned on a roofing surface such that plate member is overlapped by said roof covering to maintain watertight integrity.

5. The apparatus for mounting elements on a roof as defined in claim 1 wherein said tubular collar member is affixed to said plate member by braying thereby forming said sleeve member.

6. The apparatus for mounting elements on a roof as defined in claim 5 wherein said sleeve member is copper.

7. The apparatus for mounting elements on a roof as defined in claims 2 or 3 wherein said rod member is threadably engaged within said orifices of said U-shaped bracket and secured herein by at least one nut.

8. A combination for mounting elements comprising:
   (a) a roof being formed by a plurality of beam supports wherein are mounted a plurality of spaced transverse roof supports having a fixably attached roof covering thereon;
   (b) a sleeve member positioned on said roof covering and formed by a plate member having an opening therein and a tubular collar member affixed to said plate member in axial alignment with said opening in said plate member thereby forming a duct, said duct positioned in axial alignment with said bore in said roof covering;
   (c) a mounting member positioned on said beam supports, said mounting member having an attachment member in axial alignment with said bore in said roof covering and said duct formed in said sleeve member;
   (d) a rod member engaged to said attachment member and disposed upwardly through said bore in said roof covering and said duct formed in said sleeve member in coaxial alignment; and
   (e) a mounting assembly on said element fixably engagable with said rod member.

9. The combination for mounting elements as defined in claim 8 wherein said mounting member is a metal plate mounted on said beam support, said metal plate having a U-shaped bracket welded thereon, said U-shaped bracket provided with a pair of axially aligned threaded orifices positioned vertically with respect to said beam support and in axial alignment with respect to said bore in said roof covering and said duct formed on said sleeve member.

10. The combination for mounting elements as defined in claim 8 wherein said rod member is a threaded bolt, threadably engagable within said orifices of said U-shaped bracket.

11. The combination for mounting elements as defined in claim 8 wherein said mounting assembly on said element is a U-shaped channel having a bottom wall and pair of side walls, said side walls having an inwardly directed shoulder member, said channel having disposed therein a nut, said nut positionable to engage said rod member introduced through an orifice in said bottom wall of said U-shaped channel.

* * * * *